Jan. 10, 1956   B. FISK ET AL   2,730,215
SYNCHRONOUS STARTING CLUTCH
Filed Aug. 17, 1950   3 Sheets-Sheet 1
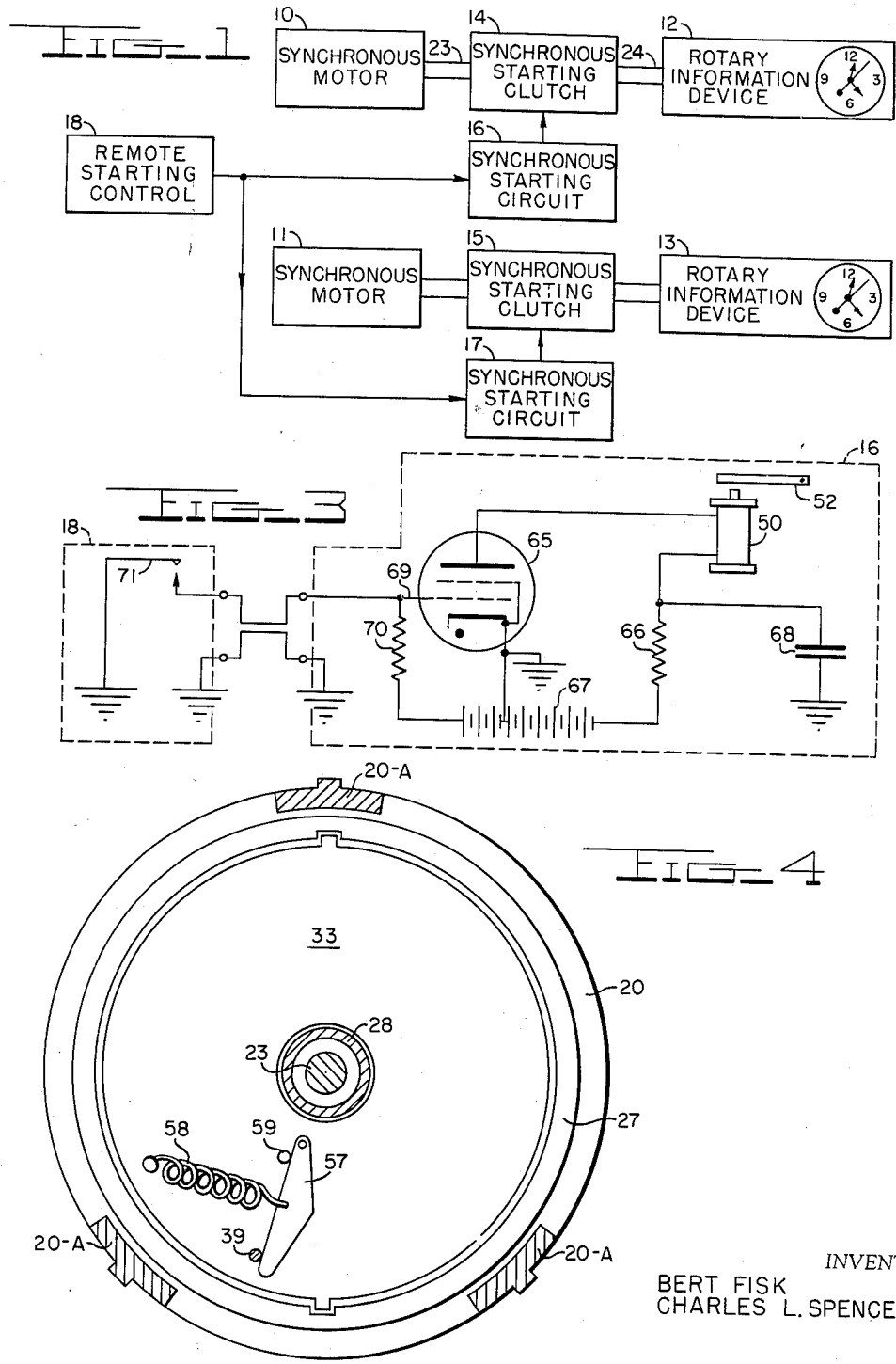
INVENTORS
BERT FISK
CHARLES L. SPENCER
BY
D. E. Snyder
Howard White
ATTORNEYS Jan. 10, 1956  B. FISK ET AL  2,730,215
SYNCHRONOUS STARTING CLUTCH
Filed Aug. 17, 1950  3 Sheets-Sheet 2
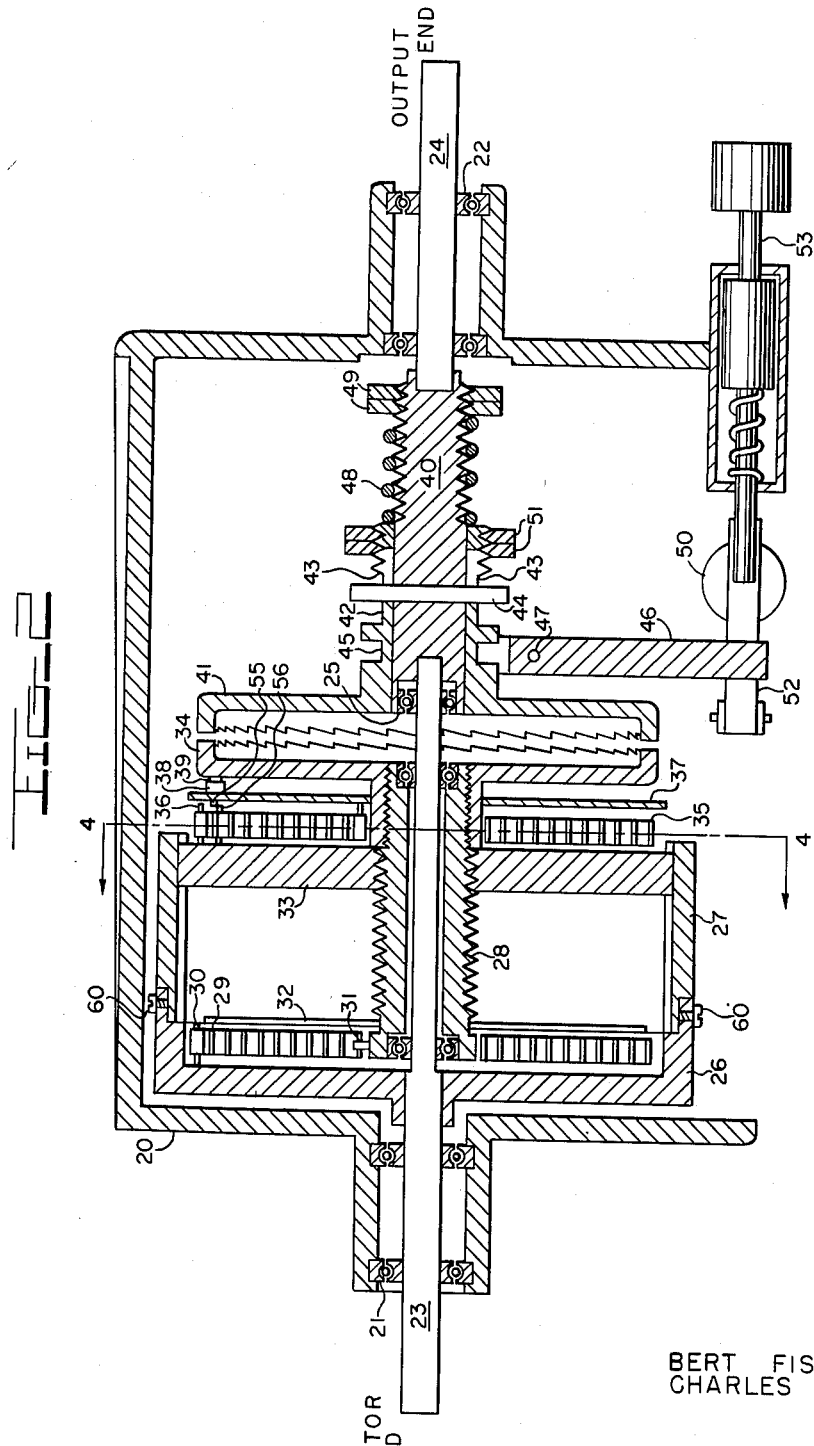
INVENTORS
BERT FISK
CHARLES L. SPENCER
BY
ATTORNEYS

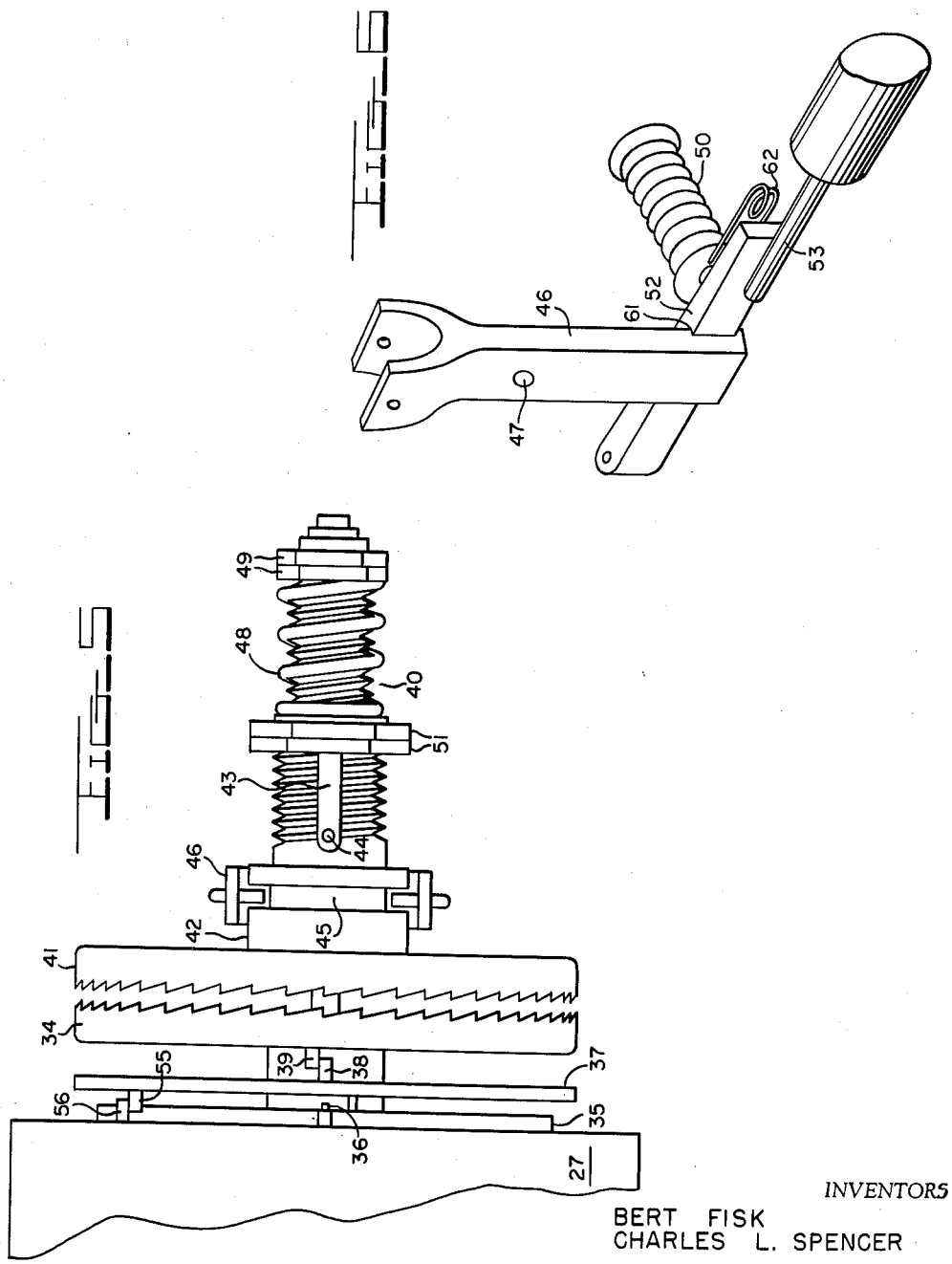

United States Patent Office 2,730,215
Patented Jan. 10, 1956

2,730,215

SYNCHRONOUS STARTING CLUTCH

Bert Fisk and Charles L. Spencer, Washington, D. C.

Application August 17, 1950, Serial No. 180,021

9 Claims. (Cl. 192—30)

(Granted under Title 35, U. S. Code (1952), sec. 266)

This invention relates generally to clutches and more particularly to an instantaneous starting clutch.

In applications where one or more rotary devices are to be turned at constant speed, it has been found that constant speed can be assured by means of a synchronous motor energized by an alternating power source of good frequency standard. However, where it is desired to start one or more devices at a given instant and rotate them at synchronous speed from that instant on without any loss of rotation, or particularly in the case of more than one device, without any difference in total revolutions, several problems are presented.

If the torque is derived through a non-slipping clutch, the sudden application of full load plus the inertia of the non-rotating device is very likely to throw the synchronous motor out of step and cause it to stop. On the other hand, if a slipping friction clutch is used, although the load may be taken up gradually by the motor, obviously some rotation will be lost.

It is therefore an object of this invention to provide an instantaneous starting clutch having none of the above disadvantages.

It is another object of this invention to provide a spring loaded positive engaging clutch for transmitting rotary motion with a minimum starting load and no loss of rotation.

It is another object of this invention to provide a system for synchronously applying a load to one or more synchronous motors, which may be remotely disposed, without any loss of rotation.

Other objects and advantages of this invention will be apparent from the following description and accompanying drawings, in which similar characters of reference indicate similar parts throughout the several views.

In the drawings:

Fig. 1 shows by block diagram an exemplary application of this invention;

Fig. 2 is a cross-sectional view of a preferred embodiment of this invention;

Fig. 3 is a schematic diagram of a portion of Fig. 1;

Fig. 4 is a cross-sectional view taken along the lines 4—4 of Fig. 2 showing a variant embodiment of this invention;

Fig. 5 is a top plan view of a portion of Fig. 2; and

Fig. 6 is a side perspective view of a portion of Fig. 2.

Briefly, this invention utilizes positive engaging clutch plates to prevent loss of rotation by slipping. The driving clutch plate is spring loaded, the spring absorbs and stores the starting load to prevent stopping the synchronous drive motor. After the load has come up to synchronous speed, the spring unwinds to drive it above synchronous speed until the exact amount of rotation lost in starting has been restored. A lead screw type of device is associated with the spring to exactly measure and restore the rotation lost in starting. The operation of this invention may be more clearly understood from the following detailed description of the novel apparatus for performing this unique operation.

Considering now Fig. 1 in detail, a block diagram is shown of a system in which the instantaneous starting clutch of this invention may be used to advantage.

Blocks 10 and 11 are a pair of synchronous motors operating at the same speed for driving a pair of rotary information devices 12 and 13 in synchronism. The rotary information devices 12 and 13 are shown in Fig. 1 as a pair of clockwork mechanisms for providing the exact identical time information in more than one location. It will be understood that the principle of this system is equally adaptable to providing time information in synchronism with other intelligence such as produced by record or motion picture camera. In fact this principle is readily adaptable to any system wherein it is desired to maintain exact synchronism between two or more rotary devices from the instant of starting without any initial loss of rotation.

Rotary motion from the synchronous motors 10 and 11 is applied respectively through two identical synchronous starting clutches 14 and 15. Each clutch 14 and 15 is engaged by its respective synchronous start circuit 16 and 17, which may be put in operation simultaneously from a remote control unit 18. The remote starting control and synchronous starting circuits are shown in detail in Fig. 3 and will be discussed in detail in connection therewith.

Fig. 2 shows a longitudinal cross section of a preferred embodiment of one of the synchronous starting clutches 14 and 15. The clutch mechanism is enclosed in a housing 20 having bearings 21 and 22 at its opposite ends to support shafts 23 and 24. Shafts 23 and 24 have a common longitudinal axis and their adjacent ends are uncoupled by the termination of shaft 23 within shaft 24 in a rotary joint 25. Each of bearings 21 and 22 support their respective shafts in two places to permit single end suspension of shafts 23 and 24.

Shaft 23 is driven by a synchronous motor such as indicated at 10 in Fig. 1. A wheel-like member 26 is secured by press fit to shaft 23 just inside the housing 20. Wheel 26 is flanged and fits like a cover on a cylindrical inner housing member 27 and supports same so that both rotate with shaft 23. An outer shaft 28 having a threaded exterior is rotatably mounted on the portion of shaft 23 lying within the housing 27. A flat spiral spring 29 is disposed adjacent and parallel to wheel 26 with one end attached thereto by pin 30. The other end of spring 29 is attached to outer shaft 28 by pin 31. A cover plate 32 supported by shaft 28 encloses spring 29 to ensure its remaining in a flat spiral. A second wheel-like member 33 is supported by threaded engagement with outer shaft 28 and is keyed to the inner wall of housing 27.

The left clutch plate 34 is fixedly supported on the right end of outer shaft 28. A second flat spiral spring 35, having about twice the stiffness of spring 29 and wound in the opposite direction, is disposed between wheel 33 and clutch plate 34 and has one end attached to wheel 33 by pin 36. The other end of spring 35 is attached to and supports stop plate 37 which is disposed between spring 35 and clutch plate 34. Stop plate 37 carries a stop 38 on its right face which normally engages a stop 39 mounted on clutch plate 34, and a stop 55 on its left face which normally engages stop 56 on the right face of wheel 33.

One inner or left end of shaft 24 terminates in an enlarged portion 40 which receives the reduced end of shaft 23 in a rotary coupling 25 and supports the right clutch plate 41. Clutch plate 41 is slidably mounted on shaft member 40 and its hub 42 is longitudinally slotted at 43 to receive pin 44 which prevents rotary sliding of clutch plate 41 on shaft member 40. Hub 42 has an annular groove 45 which is engaged by pins in yoke 46 for engaging the clutch plates. Yoke 46 is pivoted below the shaft at pin 47. Clutch plate 41 is biased toward clutch plate 34 by a helical spring 48 on shaft member 40 exerting an expanding force between hub 42 and spring adjusting and lock nuts 49 threaded to the right end of shaft member 40. When magnet 50 releases yoke 46, spring 48 slides clutch plate 41 along shaft member 40 until pin 44 abuts against stop and lock nut 51 threaded to hub 42 of clutch plate 41. Stop and lock nuts 51 permit clutch plate 41 to slide only far enough to engage clutch plate 34, thus preventing spring 48 from producing end pressure between shafts 23 and 24 and their respective bearings. After magnet 50 has been energized and its armature 52 has released yoke 46, the clutch can be disengaged and armature 52 reset by manually pushing plunger 53 against yoke 46. The configuration and operation of these components will be more readily understood by examination of Fig. 6 discussed in detail below.

Fig. 5 is a top plan view of a portion of Fig. 2, showing more clearly the engagement of yoke 46 in the annular groove 45 in hub 42. The shape of slot 43 for pin 44 may also be better observed in this view. As in Fig. 2, the stops 55, 56, 38 and 39 are shown in Fig. 5 in their normal position. It will be seen that stop 56 on wheel 33 engages pin 55 of stop plate 37 so that the torque of shaft 23 is normally transmitted through these stops. Spring 35 is wound so as to bias stops 55 and 56 together in the position shown in Figs. 2 and 5, hence when the stops are in this position no torque is transmitted through spring 35. It may be clearly seen in Fig. 5 that stop 38 engages stop 39 so that normally no torque is transmitted through these stops. As further explained below, torque may be transmitted through these stops only when clutch plate 34 tends to rotate faster than driving shaft 23. Stops 38 and 39 are biased in their normal position as shown in Figs. 2 and 5 by flat spiral spring 29 which is wound opposite to spring 35. It is now apparent that the only torque transmitted through stops 55 and 56 is that required to drive stop plate 37 with wheel 33. Referring particularly to Fig. 2, the torque transmission path from shaft 23 to clutch plate 34 is through wheel 26, spring 29, and shaft 28 which is securely threaded to clutch plate 34.

The disposition of the various parts comprising the embodiment of Figs. 2 and 5 will be more clearly understood by considering their function in the operation of this device. Before engaging the clutch plate the synchronous motor is first put in motion, thus shaft 23 and left clutch plate 34 are initially turning at synchronous speed and rotating counterclockwise as viewed from the right or output end of the assembly. Since wheel 33 is keyed to housing 27, it is also turning counterclockwise at synchronous speed and it drives stop plate 37 at synchronous speed through stops 55 and 56, which are biased together by the second spring 35. Clutch plate 34 is driven at synchronous speed through wheel 26, spring 29 and shaft 28. Stops 38 and 39 between the clutch plate and the stop plate do not drive the clutch but are normally biased together by spring 29. When magnet 50 is energized, its armature 52 will release yoke 46 and permit spring 48 to slide clutch plate 41 to the left until stop nut 51 hits pin 44 and clutch plate 41 engages clutch plate 34. The engaging of the clutch plate will impress a great retarding force on clutch plate 34. When the retarding force is applied to clutch plate 34, the clutch plate and its stop 39 slows down and since stop 38 is driven at synchronous speed from wheel 33, stops 38 and 39 move apart against the bias of spring 29. Before these stops have separated by more than one revolution, stop 38 moves axially away from stop 39 far enough to clear it by the time one revolution is lost and permit further winding up of spring 29. This is because stop 38 derives its axial position from wheel 33 which always runs at synchronous speed since it is keyed to housing 27. But since wheel 33 is threadably supported on shaft 28 which turns at the now slower rate of the clutch plate, wheel 33 is screwed along shaft 28 to the left as long as the clutch plate revolves at slower than synchronous speed. Thus stops 38 and 39 will clear after the clutch plates lose one revolution.

After the initial deceleration of clutch plate 34 upon its engagement with clutch plate 41, the clutch plates start accelerating toward synchronous speed. While the clutch plates are rotating slower than synchronous speed, wheel 33 is moving to the left and spring 29 is winding up and storing the number of revolutions lost in starting. In a preferred embodiment the spring and shaft were designed to take up as many as 20 turns.

When the clutch plates have reached synchronous speed, the wheel 33 and its associated spring and stop plate are at some position to the left of their normal position shown in the drawings where stops 38 and 39 are abutting and spring 29 is wound by the number of revolutions lost in starting. This produces a potential energy in the spring which is added to the torque of the motor in driving the clutch plates hence the clutch plates will continue to accelerate. The clutch plates then run above synchronous speed. While the clutch plates are running above synchronous speed, since wheel 33 is maintained at synchronous speed by being keyed to housing 27, wheel 33 will be screwed along shaft 28 to the right and spring 29 will be unwound. When spring 29 has thus been unwound all the rotation lost in starting will be restored, wheel 33 will have returned to its normal position, and stop 39 will turn up against stop 38. There may be a tendency for the clutch plates to overrun synchronous speed after the spring 29 has unwound, in which case stop 39 will turn up sharply against stop 38 which is running at synchronous speed. Rather than allow this shock to be absorbed by stop 38, which would tend to accelerate shaft 23 and throw the motor out of step, spring 35 is arranged to absorb the shock. As can be clearly seen from Fig. 5, when stop 39 comes up against stop 38 it tends to pull stop 55 away from stop 56 against the bias of spring 35. After the force is absorbed spring 35 will return stop 55 against stop 56. In the preferred embodiment shown in Fig. 2, spring 35 can absorb up to one revolution before stops 55 and 56 will come back to back and prevent further winding of said spring 35.

A variant embodiment is shown in Fig. 4 which is a cross section taken along the lines 4—4 of Fig. 2. This embodiment differs from Fig. 2 in that it does not have the spring 35, or stop plate 37. The Fig. 4 embodiment is simpler than the Fig. 2 embodiment but provides less shock absorbing action.

In Fig. 4, instead of a flat spiral spring and a stop plate, stop 39 on the clutch plate is biased against a spring loaded lever 57 pivotably mounted on wheel 33. Stop 39 and lever 57 are normally biased together by the flat spiral spring 29 of Fig. 2.

After the starting loss is overcome and stop 39 comes up against lever 57, coil spring 58 allows lever 57 to give a part of a turn. After spring 58 has absorbed the shock it will return lever 57 to its normal position against stop 59. The manner in which wheel 33 is keyed to housing 27 is clearly shown in Fig. 4. It may also be noted in Fig. 4 that the housing 20 preferably does not have solid sides but merely three struts 20A, thereby facilitating access to the clutch mechanism.

Referring again to Fig. 2, the cover like engagement of wheel 26 with inner housing 27 is rotatable and is fixed in position by set screws 60. By loosening these set screws and rotating housing 27 with respect to wheel 26, the tension of spring 29 may be adjusted.

Now referring to Fig. 6, the starting yoke 46 and its associated apparatus is shown in perspective. Prior to starting the motor, or to disengaging the clutch, plunger 53 is pushed against the lower end of yoke 46 forcing it to the left against spring 48 of Figs. 2 and 5 until it passes detent 61 in armature 52. Armature 52 is normally biased against yoke 46 by a small spring 62 so that detent 61 will catch and hold the yoke 46. Because of pivot 47, the leftward movement of the yoke's lower end moves its upper or yoke end to the right separating the clutch plates. Energizing magnet 50 will pull armature 52, releasing the yoke 46 and engaging the clutch plates.

A preferred circuit for energizing magnet 50 is shown in Fig. 3. The magnet is connected from the plate of a grid controlled gas tube 65 through a large resistor 66 to a direct current source 67. A large condenser 68 is connected from the common ground of the circuit to the junction of magnet 50 and resistor 66. The condenser is charged through resistor 66 to the source potential while tube 65 is non-conducting. When tube 65 conducts it discharges condenser 68 through the magnet producing a momentary deflection of armature 52. A control grid 69 is connected to a negative voltage source through resistor 70 to normally bias the tube non-conducting. Tube 65 may then be fired simply by grounding grid 69. This may conveniently be done from a remote control point by a single switch 71. Furthermore, this simple remote switch may just as well be used to simultaneously ground the grids of any number of control tubes for synchronously engaging any number of synchronous starting clutches as indicated in Fig. 1.

After switch 71 has been opened and condenser 68 discharged, the voltage at the plate of tube 65 becomes so low because of the large resistor 66 that the tube quenches and its grid 69 regains control. Condenser 68 again charges to the source potential and the synchronous starting circuit is automatically reset. Obviously these devices or arrangements may be used to engage the clutch plate and the circuits may be used to energize the magnet.

Although certain specific embodiments of this invention have been herein disclosed and described, it is to be understood that they are merely illustrative of this invention and modification may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A synchronous starting device comprising, an input shaft, an externally threaded cylindrical member coaxial with said shaft and rotatably mounted thereon, spring means having one end attached to said shaft and the other end to said cylindrical member, reference means disposed on said member in threaded engagement therewith, keying means affixed to said shaft and slidably engaging said reference means to turn said reference means with said shaft, a first clutch plate mounted on one end of said cylindrical member, an output shaft having a common axis with said input shaft, a second clutch plate disposed on said output shaft to rotate therewith and axially moveable thereon to be engageable with said first clutch plate, a positioning stop on said first clutch plate, and means engaging said reference means with said positioning stop when said reference means is in a predetermined axial position on said cylindrical member.

2. A synchronous starting device comprising, an input shaft, an externally threaded cylindrical member coaxial with said shaft and rotatably mounted thereon, spring means having one end attached to said shaft and the other end to said cylindrical member, reference means disposed on said member in threaded engagement therewith, keying means affixed to said shaft and slidably engaging said reference means to turn said reference means with said shaft, a first clutch plate mounted on one end of said cylindrical member, an output shaft having a common axis with said input shaft, a second clutch plate disposed on said output shaft to rotate therewith and axially moveable thereon to be engageable with said first clutch plate, a first positioning stop mounted on said first clutch plate, a second positioning stop, means resiliently mounting said second stop on said reference means, said first and second stops being biased together by said spring and in engagement when said reference member is at the clutch plate end of and rotating at the same speed as said cylindrical member.

3. A synchronous starting device comprising, an input shaft, an externally threaded cylindrical member coaxial with said shaft and rotatably mounted thereon, spring means having one end attached to said shaft and the other end to said cylindrical member, reference means disposed on said member in threaded engagement therewith, keying means affixed to said shaft and slidably engaging said reference means to turn said reference means with said shaft, a first clutch plate mounted on one end of said cylindrical member, an output shaft having a common axis with said input shaft, a second clutch plate disposed on said output shaft to rotate therewith and axially moveable thereon to be engageable with said first clutch plate, a first positioning stop mounted on said first clutch plate, a second positioning stop, a support means for said second stop, resilient mounting means mounting said support means on said reference means, said first and second stops being biased together by said spring and in engagement when said reference member is at the clutch plate end of and rotating at the same speed as said cylindrical member, third and fourth positioning stops respectively disposed on said reference means and said support means and biased together by said resilient mounting.

4. A synchronous starting device comprising, an input shaft rotating at constant speed, an externally threaded cylindrical member coaxial with said shaft and rotatably mounted thereon, a first disc attached to said shaft near one end of said cylindrical member, a flat spiral spring coaxial with said shaft and having one end attached to said first disc and the other end to said end of said cylindrical member, a first clutch plate attached to the other end of said cylindrical member, a cylindrical housing attached to said first disc and disposed to enclose said cylindrical member, a second disc disposed within and keyed to said housing against rotation but axially slidable therein and threaded to engage said cylindrical member, an output shaft having a common axis with said input shaft, a second clutch plate disposed on said output shaft and keyed thereto against rotation but axially slidable thereon to be engageable with said first clutch plate, a positioning stop on said first clutch plate, and means engaging said second disc with said positioning stop when said second disc is in a predetermined axial position on said cylindrical member.

5. A synchronous starting device comprising, an input shaft rotating at constant speed, an externally threaded cylindrical member coaxial with said shaft and rotatably mounted thereon, a first disc attached to said shaft near one end of said cylindrical member, a flat spiral spring coaxial with said shaft and having one end attached to said first disc and the other end to said end of said cylindrical member, a first clutch plate attached to the other end of said cylindrical member, a cylindrical housing attached to said first disc and disposed to enclose said cylindrical member a second disc disposed within and keyed to said housing against rotation but axially slidable therein and threaded to engage said cylindrical member, an output shaft having a common axis with said input shaft, the adjacent ends of said shafts fitting one inside the other in a rotatable joint, a second clutch plate disposed on said output shaft and keyed thereto against rotation but axially slidable thereon to be engageable with said first clutch plate, and a positioning stop on said first clutch plate, and means engaging said second disc with said positioning stop when said second disc is in a predetermined axial position on said cylindrical member.

6. A synchronous starting device comprising, an input shaft rotating at constant speed, an externally threaded cylindrical member coaxial with said shaft and rotatably mounted thereon, a first disc attached to said shaft near one end of said cylindrical member, a flat spiral spring coaxial with said shaft and having one end attached to said first disc and the other end to said end of said cylindrical member, a first clutch plate attached to the other end of said cylindrical member, a cylindrical housing attached to said first disc and disposed to enclose said cylindrical member, a second disc disposed within and keyed to said housing against rotation but axially slidable therein and threaded to engage said cylindrical member, an output shaft having a common axis with said input shaft, a second clutch plate disposed on said output shaft and keyed thereto against rotation but axially slidable thereon to be engageable with said first clutch plate, a positioning stop on said first clutch plate, and spring loaded means engaging said second disc with said positioning stop when said second disc is in a predetermined axial position on said cylindrical member.

7. A synchronous starting device comprising, an input shaft rotating at constant speed, an externally threaded cylindrical member coaxial with said shaft and rotatably mounted thereon, a first disc attached to said shaft near one end of said cylindrical member, a flat spiral spring coaxial with said shaft and having one end attached to said first disc and the other end to said end of said cylindrical member, a first clutch plate attached to the other end of said cylindrical member, a cylindrical housing attached to said first disc and disposed to enclose said cylindrical member, a second disc disposed within and keyed to said housing against rotation but axially slidable therein and threaded to engage said cylindrical member, an output shaft having a common axis with said input shaft, a second clutch plate disposed on said output shaft and keyed thereto against rotation but axially slidable thereon to be engageable with said first clutch plate, a positioning stop on said first clutch plate, and spring loaded means engaging said second disc with said positioning stop when said second disc is in a predetermined axial position on said cylindrical member, said flat spiral spring being biased to normally maintain said second disc and said positioning stop in engagement through said last named means.

8. A synchronous starting device comprising, an input shaft rotating at constant speed, an externally threaded cylindrical member coaxial with said shaft and rotatably mounted thereon, a first disc attached to said shaft near one end of said cylindrical member, a flat spiral spring coaxial with said shaft and having one end attached to said first disc and the other end to said end of said cylindrical member, a first clutch plate attached to the other end of said cylindrical member, a cylindrical housing attached to said first disc and disposed to enclose said cylindrical member, a second disc disposed within and keyed to said housing against rotation but axially slidable therein and threaded to engage said cylindrical member, an output shaft having a common axis with said input shaft, a second clutch plate disposed on said output shaft and keyed thereto against rotation but axially slidable thereon to be engageable with said first clutch plate, a first positioning stop on said first clutch plate, a third disc disposed parallel to said second disc and separating it from said first clutch plate, a second flat spiral spring connected between said second and third discs and supporting said third disc, a second positioning stop on said third disc normally engaging said first positioning stop through the bias of said first spring, and third and fourth positioning stops on said second and third discs respectively normally in engagement through the bias of said second spring.

9. A synchronous starting device comprising, an input shaft rotating at constant speed, an externally threaded cylindrical member coaxial with said shaft and rotatably mounted thereon, a first disc attached to said shaft near one end of said cylindrical member, a flat spiral spring coaxial with said shaft and having one end attached to said first disc and the other end to said end of said cylindrical member, a first clutch plate attached to the other end of said cylindrical member, a cylindrical housing attached to said first disc and disposed to enclose said cylindrical member, a second disc disposed within and keyed to said housing against rotation but axially slidable therein and threaded to engage said cylindrical member, an output shaft having a common axis with said input shaft, a second clutch plate disposed on said output shaft and keyed thereto against rotation but axially slidable thereon to be engageable with said first clutch plate, a first positioning stop on said first clutch plate, a third disc disposed parallel to said second disc and separating it from said first clutch plate, a second flat spiral spring connected between said second and third discs and supporting said third disc, a second positioning stop on said third disc normally engaging said first positioning stop through the bias of said first spring, and third and fourth positioning stops on said second and third discs respectively normally in engagement through the bias of said second spring, said second spring being oppositely biased and having greater stiffness than said first spring.

References Cited in the file of this patent

UNITED STATES PATENTS

| | | |
|---|---|---|
| 1,068,801 | Melaun | July 29, 1913 |
| 1,420,214 | Pierce | June 20, 1922 |
| 2,479,986 | Thomas | Aug. 23, 1929 |